May 26, 1931. C. BRACKELSBERG 1,807,468
PROCESS AND DEVICE FOR THE PRODUCTION OF IRON
ALLOYS FREE FROM GASES, ESPECIALLY OXYGEN
Filed Feb. 6, 1929
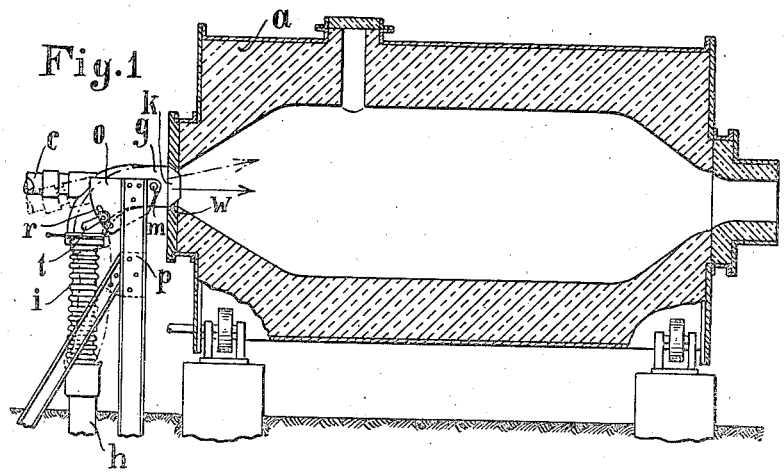
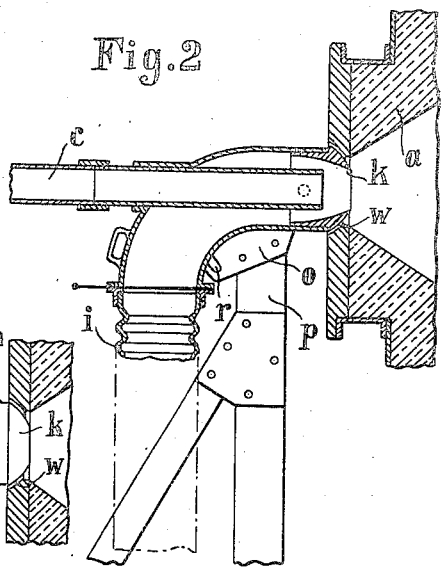
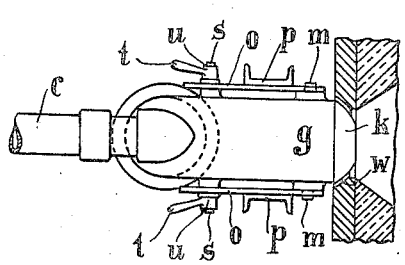
Inventor:
Carl Brackelsberg Patented May 26, 1931

1,807,468

REISSUED
UNITED STATES PATENT OFFICE

CARL BRACKELSBERG, OF MILSPE, GERMANY

PROCESS AND DEVICE FOR THE PRODUCTION OF IRON-ALLOYS FREE FROM GASES, ESPECIALLY OXYGEN

Application filed February 6, 1929, Serial No. 337,747, and in Germany February 16, 1928.

It is a known fact, that iron-alloys in a molten state vehemently dissolve gases and this dissolving capacity is increased in proportion to the increase in temperature. The conditions in connection with the dissolving of oxides or in accordance therewith. The gases and oxides absorbed by the liquid iron represent the causes of various failures in the iron- and steel- foundry, such as high viscosity of the cast-metal, as well as blisters, pores and spongy parts in the castings. The latter defects are also caused by the gases which are formed by the reaction of the oxides contained in the cast-metal with the carbon always present. The absorption of gases and oxides in the cupola-furnace takes place in the smelting-zone and below the same, in which the liquid iron is brought in contact with the furnace-gases or with the blast-air in a finely dissolved form and in the flame-furnace by the direct influence of the flame permanently directed upon the hearth, which forces back the protective layer of slag or comes in contact with the locally exposed or splashing up metal during the boiling of the hearth. The protective measures adopted in steel-foundries for the purpose of neutralizing the deleterious effects of the absorption of gases and oxides consist in adding prior to the casting process deoxidation- or calming-media, in most cases manganese and silicon. This measure, however, never proves entirely successful, because, in connection herewith only separate gases, and of these only a certain part, are acted upon. There is, moreover the risk, that the deoxidation-products are retained in the liquid steel and thus increase its viscosity. The waste by blistered or porous casting or by viscid cast-metal is impossible of being avoided by these expedients. Similarly there remain in the cast-iron which absorbed gases and oxides from the furnace-atmosphere during the smelting process, in spite of a comparatively high percentage of silicon, manganese and carbon, considerable quantities of these impurities in solution which are the cause of waste. It is, therefore, obvious, that the essential causes of waste-castings referred to in the iron- and steel-foundry cannot with certainty be eliminated with the aid of alloying elements. The establishment of this fact points to the task of conducting the smelting operations in such a manner, that the liquid metal is prevented from absorbing gases or oxides or at least from absorbing gases and oxides in such quantities, that they will cause difficulties during the casting-operations or waste.

In accordance with the present invention this aim is attained by the fact, that the smelting of the charge in a revoluble furnace by means of coal-dust firing is effected most rapidly and without any accentuated oxidation on account of the extraordinarily hot coal-dust-flame and the rotary movement of the furnace, in connection with the liquid metal is protected or prevented from absorbing gases from the furnace-gases by an unbroken layer of slag resting upon the bath during the whole of the process.

The oxidation of the charge is quite minimal in the rapidly smelting furnace especially on account of the fact, that the combustion of coal-dust does not require any excess of oxygen and that the flame during the melting down may be maintained faintly reducing without any specially deleterious influence upon the working. The inconsiderable quantities of oxide adhering to the melting metal are expelled therefrom immediately during the smelting process and transferred to the slag. A dissolution of these oxides through the liquid metal is scarcely to be assumed on account of the very low solubility just above the melting point. The freedom from oxides of the bath embodies the advantage, especially in regard to alloys rich in carbon that a brisk boiling has been rendered impossible owing to the reaction of the oxygen with the carbon, with the result, that the layer of slag is not disturbed or broken. The reaction of iron-alloys rich in carbon with the slag containing a high percentage of metallic oxides is of a very quiet nature, as shown by the observation of the surface of the bath.

The quiet behaviour of the iron-bath, as well as the coal dust flame quietly passing over the bath, whereby the flame can be advantageously pointed upwards in an oblique direction, ensures that the metal is safely protected from the effects of furnace-gases and that a saturation of the iron with gases or oxides has been rendered absolutely impossible. This protection is all the more important, the higher the temperature of the cast-metal, because it is only during the liquid phase that the absorptive properties of the iron in regard to gases assume higher values, strongly increasing in conjunction with a further increased temperature.

The freedom from gas and oxides of iron-alloys melted in accordance with this process is demonstrated by the fact, that the liquid iron upon cooling down in the shank exhibits no gas-exits of whatever nature and that it permits, practically independent of its chemical composition, the casting of the thinnest cross sections and eliminating any waste due to blisters or pores.

The production of iron-alloys free from gas and especially free from oxides, is of quite special importance to temper-casting. A considerable percentage of the metallic oxides present in iron-alloys is expelled upon their solidification from the dissolution with the iron and remains between the crystals upon the crystallisation of the alloy in the shape of extensive and adhering iridescent pellicles. They not only disturb the metallic connection of the alloy most acutely, but they also retard the diffusion of the carbon or of carbonaceous gases during tempering. The consequence is, that the duration of tempering is considerably prolonged and that the properties of strength, especially the tensile strength are considerably impaired. The temper-casting poor in gases and oxides produced in accordance with the present process, considerably reduces the tempering process, compared to the casting molten in accordance with the other known processes, whilst its tensile values are double as high as the former may possess in the most favourable circumstances.

The invention has been represented by way of example in the accompanying drawings, in which Fig. 1 illustrates the complete smelting furnace in vertical longitudinal section with lateral view of the twyer, Fig. 2 shows a vertical longitudinal section through the twyer of the burner with the adjoining part of the revoluble furnace on an enlarged scale.

Fig. 3 is a top-view of the twyer on an enlarged scale.

$a$ is a revoluble furnace capable of rotation about a horizontal longitudinal axis, at one end of which the air and the coal-dust feeding device has been provided. The air is forced in connection herewith through the vertical tube $h$ into the burner $g$ at a high rate of speed, whilst the coal-dust is introduced through the horizontal tube $c$, terminating concentrically in a known manner within the burner, into the latter.

The burner $g$ is, in accordance with the invention, capable of being adjusted under different angles of height in regard to the longitudinal axis of the furnace $a$, with the result that the flame may be turned away from the charge more or less if desired and directed against the upper part of the interior wall of the furnace.

To this end the burner $g$ has been connected with the air-conduit $h$ by means of a pliable tube-part $i$, whilst, in the neighbourhood of the head $k$, it is provided with two lateral pivots $m$, which have been positioned in two plates $o$ situated laterally to the burner $g$. The plates or flaps $o$ have been attached to the upper end of a vertical column $p$ each and are provided at the end opposite to the pivot $m$ with a longitudinal slot $r$ disposed radially to said pivot. Said longitudinal slot $r$ serves as guide for bolts $s$ situated on either side of the burner. Upon its free end provided with a thread, the bolt $s$ carries a nut $u$ provided with a handle $t$ whereby an adjustment of the bolt $s$ may be effected along the slot $r$ and in conjunction therewith an adjustment of the burner $g$ under any desired angle.

The head $k$ of the burner $g$ possesses at the forward end a spherical surface and is fitted into a correspondingly shaped aperture $w$ of the revoluble furnace $a$, with the result that, as shown in Fig. 1 in dotted lines, said furnace is rendered perfectly tight in any position of the burner $g$. It is, therefore, quite simple to so adjust the furnace-flame, that it is more or less turned away from the charge.

It is an essential characteristic of the furnace, that the coal-dust flame immediately enters the furnace and that it is so guided, that the ashes contained in the flame is for the most part caused to leave the furnace again, without influencing to an appreciable extent the smelting process. Simultaneously with the ash the whole of the sulphur contained in the coal is made to escape from the furnace. The carrying out of the process is further aided by the very great advantage embodied by the coal-dust firing, that, in order to ensure a complete combustion, no appreciable excess of air is required. In consequence thereof, temperatures of flame may be attained, which approach the theoretical, yielding the possibility to work, when melting down, with a faintly reducing flame, or at least with a flame which does not strongly oxidize and which nevertheless possesses a temperature ensuring a rapid smelting.

During the melting down the furnace is made to describe only a few oscillatory movements for the purpose of bringing the coldest parts of the charge in contact with the flame again and again, with the result, that the charge is evenly and rapidly heated. The melting down process is, therefore, of much shorter duration than in conjunction with the fixed flame-furnace at the same temperature of flame and the utilization of the heat is decidedly more favourable owing to the greater difference in temperature between the flame and that surface of the charge turned towards it. The acceleration of the melting down process obviates an accentuated oxidation of the charge, especially so, if during this period a faintly reducing flame is made use of. At the moment of the melting down the adhering oxide is easily expelled and transferred to the slag; the dissolving property of iron in regard to oxides slightly above the melting point is only inconsiderable.

Immediately after the melting down the liquid metal is covered by a layer of slag, some lime having been added previously for the purpose of aiding the formation of slag. During the further progress of the smelting process the metal-bath is not subjected to the influence of the furnace-gases owing to being covered by a close layer of slag. The latter, however, is comparatively thin, i. e., not so thick that it acts as heat-insulator. An immediate contact of the metal with the flame takes place only during the period of melting down, i. e. at a time, when the dissolving capacity of the iron in regard to gases is still quite inconsiderable. In a liquid state the dissolving capacity of iron in regard to gases is considerably greater than in a solid state and it is further increased in conjunction with an increase in temperature. During that period in which the liquid iron is superheated to assume the requisite casting temperature, i. e. in which it would be capable of absorbing gases to the fullest possible extent, it is withdrawn from the influence of the furnace temperature by a well protecting layer of slag.

It is to be ascribed to the special conditions prevailing in conjunction with the carrying out of this process, that during the superheating of the liquid metal the layer of slag is not broken, either as a result of brisk boiling, or by a too violent action of the coal-dust flame upon the bath.

Owing to the favourable condition of affairs that, when melting down, no appreciable quantities of metallic oxides find their way into the bath, a boiling of the bath owing to reaction of the carbon with any oxides which may be present in the bath does not take place to any marked extent. The reaction between the contents of carbon of the bath and the metallic oxides in the slag progresses very quietly and does not cause any splashing up of metal, whereby the latter would be further oxidized.

Although the coal-dust flame developes extraordinarily rapidly, it is so conducted, that it fairly evenly fills up the free furnace-space, without, however, hitting the bath with full force in any one place and thereby forcing back the layer of slag. Slag and the walls of the furnace take up the heat and subsequently transfer it to the metal. An immediate action of the flame upon the bath does not, therefore, take place.

In conjunction with the process under consideration and for which protection by Letters Patent is being applied for, the iron will scarecely have an opportunity of dissolving gases or oxides. Oxides which penetrate into the bath and are suspended there, may be absorbed by the slag. For this reason the finished alloys are extremely poor in gases and dissolved or suspended oxides.

In the points mentioned this smelting process essentially differs from the usual processes for smelting cast-iron hitherto made use of.

In conjunction with the cupola-furnace it is not possible to avoid, that the liquid iron spraying down dissolves gases and oxides from the atmosphere of the furnace and, moreover, causes oxides to be transferred to the iron-bath in fine distribution. In connection with this process the danger of obtaining an iron which is rich in gases and oxides, is very great.

In the fixed flame-furnace, the melting down requires a very considerable time owing to the unfavourable transfer of heat to those parts of the charge which do not happen to be on the surface, with the result, that already during the melting down process there is a possibility of a saturation of the iron with gases from the atmosphere of the furnace whilst it is still in a solid state. For the purpose of favourably utilizing the heat for smelting, as well as for preventing a rapid destruction of the top of the furnace, the flame must be pointed to the bath, whereby a direct contact with the shiny metallic surface cannot be avoided. The strongly heated part of the charge possesses an increased dissolving capacity in regard to gases in accordance with its temperature, which are transferred immediately to the metal at this point through the medium of the flame. This influence of the bath is especially accentuated in conjunction with the oil-furnace, in which the comparatively small jet of flame acts very sharply upon the metal-bath. Only with the aid of the electro-furnace will it be possible to produce a good quality cast-iron, which process, however, is too uneconomical for smelting purposes.

By means of the process under consideration iron-alloys may be smelted at a lower cost than has been possible heretofore, and these iron-alloys are distinguished by a particularly high grade quality.

Claims.

1. Process for the production of iron alloys substantially free from gases and oxygen, which consists in first melting a charge of iron in a rotary furnace by means of the direct heat of the combustion gases from coal dust, then applying to the surface of the molten metal a thin unbroken layer of slag, and then continuing the heating of the liquid metal by transmission of heat thereto through the walls of the furnace while the metal is protected by the thin interposed layer of slag from direct contact with the furnace gases and the absorption of gases therefrom.

2. Process for the production of iron alloys substantially free from gases and oxygen, which consists in first directly melting the charge by the direct heat of combustion gases of burning coal-dust in a rotary furnace, covering the melted charge with a thin unbroken layer of slag, and then continuing the treatment of the metal at a higher temperature during which the metal is protected from the direct heat of the combustion gases by the slag layer and communicated thereto through the furnace lining in the rotation of the furnace.

3. Process for the production of iron alloys substantially free from gases and oxygen, which consists in first subjecting the charge in a rotary furnace, while oscillating the furnace, to the direct heat of combustion gases of burning coal dust until the charge is melted, then covering the melted charge with a thin unbroken layer of slag, and then rotating the furnace and continuing the treatment of the metal at a higher temperature during which a major portion of the heat of the combustion gases is concentrated on the furnace lining and transmitted therefrom to the metal in the rotation of the furnace while the metal is protected from direct contact with the combustion gases by the slag layer.

4. Process for the production of iron alloys substantially free from gases and oxygen, which consists in placing a charge of iron in a rotary furnace, oscillating the furnace and subjecting the charge to the direct heat of the gases of combustion from coal dust until the charge is melted, then covering the surface of the charge with a thin unbroken layer of slag, and then rotating the furnace and concentrating the major portion of the heat of the combustion gases against the furnace walls, whereby the heat will be transmitted through such walls to the metal in the rotation of the furnace while the slag layer protects the metal from direct contact with the combustion gases and the absorption of gases therefrom.

In testimony whereof I affix my signature.

CARL BRACKELSBERG.